United States Patent [19]
Dobesh

[11] 4,079,619
[45] Mar. 21, 1978

[54] APPARATUS AND METHOD FOR STANDARDIZING A PIPELINE PIG DETECTOR

[75] Inventor: Eugene Leslie Dobesh, Houston, Tex.

[73] Assignee: F. H. Maloney Company, Houston, Tex.

[21] Appl. No.: 649,190

[22] Filed: Jan. 15, 1976

Related U.S. Application Data

[63] Continuation of Ser. No. 511,667, Oct. 3, 1974, abandoned.

[51] Int. Cl.² ............................................. G01F 25/00
[52] U.S. Cl. .......................................................... 73/3
[58] Field of Search .......... 73/3; 200/153 T, 153 LA, 200/61.41, 61.42, 249, 286

[56] References Cited
U.S. PATENT DOCUMENTS

| 3,145,274 | 8/1964 | Van Scoy et al. | 200/61.41 |
| 3,419,690 | 12/1968 | Garig | 200/61.41 |
| 3,419,692 | 12/1968 | Palen | 200/153 T |

Primary Examiner—Donald O. Woodiel
Attorney, Agent, or Firm—Arthur M. Dula; Ned L. Conley; Murray Robinson

[57] ABSTRACT

A detector assembly having a movable trigger adapted to adjustably activate a signaling means is removably mounted on a fixed base attached to a pipeline. A pig passing through the pipeline displaces the detector's trigger through a certain minimum distance to activate the signaling means. A calibrated jig is provided and configured to hold the detector assembly and move its trigger through this same minimum distance. The jig thus simulates the presence of a pig.

A method of calibrating a pig detector is also disclosed. A detector assembly is mounted in the jig and the signaling means is adjusted until it just activates. This adjustment is fixed and the calibrated detector replaced on its permanent mount. All similarly calibrated detectors will signal when a pig reaches the same point in the pipeline.

3 Claims, 5 Drawing Figures

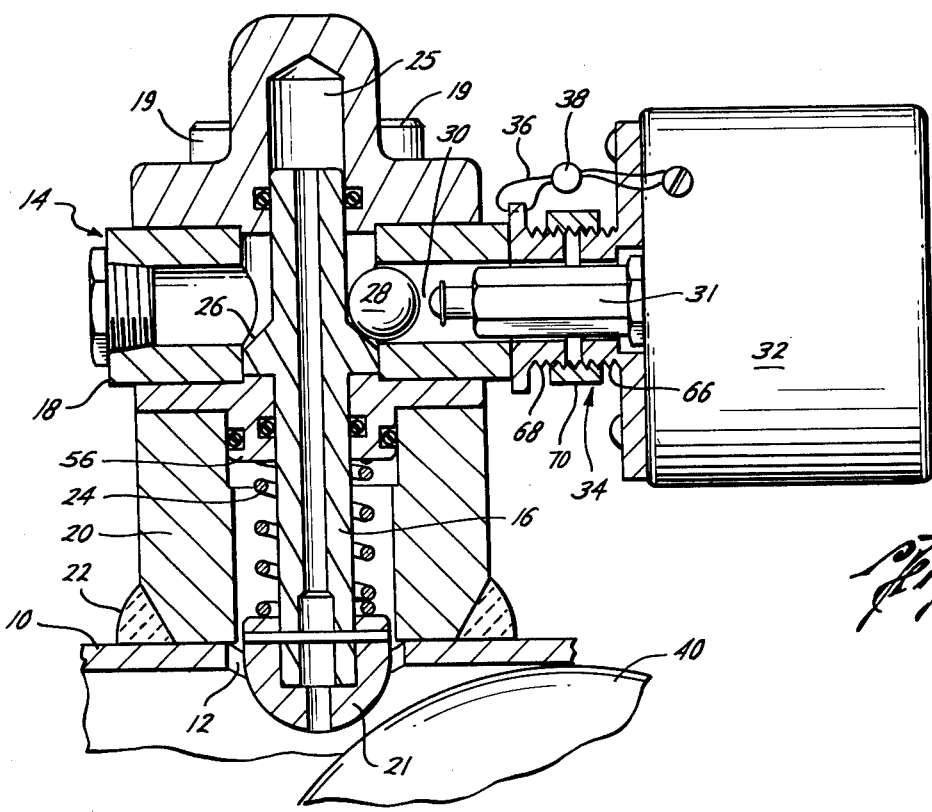

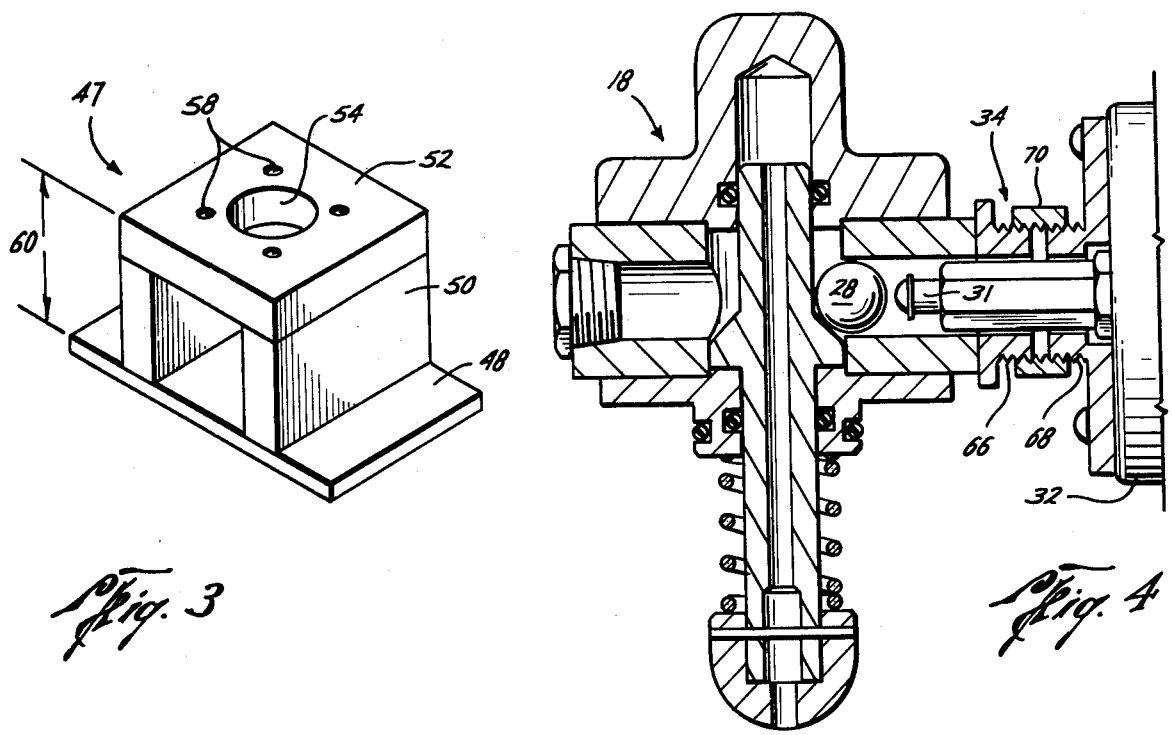
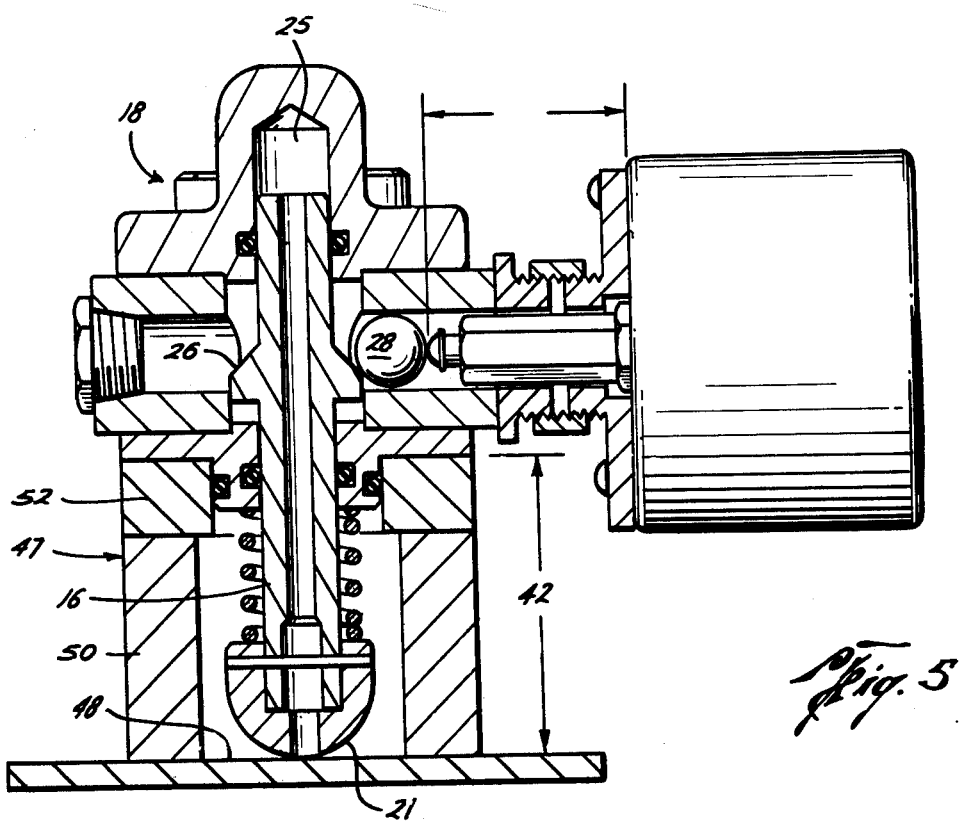

APPARATUS AND METHOD FOR STANDARDIZING A PIPELINE PIG DETECTOR

This is a continuation of application Ser. No. 511,667, filed Oct. 3, 1974, now abandoned.

BACKGROUND OF THE INVENTION

1. Field of the Invention

The invention relates to pipeline pig detectors and more particularly relates to an improved apparatus and method for standardizing a pig detector's trip point so any standardized detector will reproduceably and interchangeably signal when a pig reaches the same point in a pipeline.

2. Description of the Prior Art

A solid object such as a sphere or scraper, introduced into a pipeline and propelled by the fluid flowing therein, is commonly called a pig. It is sometimes necessary to detect the pig's position for various reasons. Typically, pig detectors employ a mechanical sensing means, such as a moveable trigger, to contact the pig. The trigger is mechanically coupled to a reporting means, such as a switch or valve, and is adapted to actuate this reporting means when the trigger is moved by the pig. An excellent example of such a pig detector is disclosed in U.S. Pat. No. 3,145,274, which is here incorporated by reference. Such detectors adequately perform the gross function of reporting a pig's approximate location in the pipeline.

One use of a pig detector is as a sensor in a device known as a meter prover. A meter prover is a precision flow meter used to calibrate commercial flow meters. They are generally accurate to 0.02%. Typically a pig is propelled by flowing fluid through a measured length of pipe having a known cross-section. The amount of fluid passing through the tube may be determined from the length of time required for the pig to travel from beginning to end of the measured section. In this device, the pig detector performs the critical role of sensing and reporting the pig's entry into and exit from the measured section. An excellent example of a meter prover is disclosed by U.S. Pat. No. 3,738,153, which is now incorporated by reference.

Calibration of a meter prover is difficult, expensive and time consuming. Once the system is calibrated, however, it yields highly accurate results. Virtually the only moving parts that wear out in a meter prover are the pig and the pig detectors. The pig is generally a sphere and may be replaced by any other sphere of congruent geometry made from similar material. Replacing the meter prover presents a more difficult problem.

When a pig detector is removed from the meter prover for repair or replacement, it is necessary to volumetrically re-calibrate the entire meter prover system. This is because the trigger of the new or repaired detector activates its associated switch or valve when the pig is in a slightly different position in the tube than did the previously mounted pig detector. In most uses these differences are so slight they may safely be ignored. Unfortunately, in precision meter provers these differences in activation points cause unacceptably large measurement errors and necessitate the aforementioned lengthy and costly re-calibration.

SUMMARY OF THE INVENTION

According to the present invention, a fixed base is mounted on a pipeline. A detecting apparatus having a trigger that extends into the pipeline is fitted to this base and removably attached to it by screws. The detector activates when a pig moves its trigger to a known distance below the top of the base. The invention provides a jig that reproduces this exact distance from the top of the base to the bottom of the trigger and is attachable to the detector when the apparatus is removed from its base. An adjustable coupling in the mechanical means connecting the trigger to the switch or other reporting means is adapted to place a variable amount of slack in the linkage between the trigger and the switch. When a detecting apparatus is mounted in the jig, its trigger assumes the same position relative to the switch it would assume if a pig had just activated the detector. With the trigger in this condition the adjustable coupling between trigger and switch is adjusted until the switch just closes. The adjustment is then locked in this position and the detector assembly placed on its permanent base on the pipeline. The newly repaired or replaced detector assembly will trigger when a pig reaches exactly the position in the pipeline that would have triggered the detector it replaced.

BRIEF DESCRIPTION OF THE DRAWINGS

FIG. 1 is an elevational view of one embodiment of a pig detector shown in the unactivated condition and attached to the pipeline according to this inventon, parts being shown in section and depicted in somewhat schematic form;

FIG. 2 is an elevational view of a pig detector as shown in FIG. 1 in the condition of having just been activated by a pig;

FIG. 3 is an isometric view of a shop calibration jig according to one embodiment of this invention;

FIG. 4 is a cross-sectional view showing one embodiment of the detector assembly removed from the fixed base according to this invention; and FIG. 5 is a cross-sectional view of the detector shown by FIG. 4 mounted in the calibration jig shown in FIG. 3 in the condition illustrated by FIG. 2.

DESCRIPTION OF THE PREFERRED EMBODIMENTS

In the embodiment of the invention shown in FIGS. 1 and 2 pipeline 10 is provided with an opening 12. A pig detecting apparatus 14, which is described in detail in the disclosure incorporated by reference, is mounted so its associated trigger 16, having an end 21, extends through opening 12 in the pipeline. Generally, pig detector 14 has upper housing 18 removably attached to fixed base 20 by screws 19. Base 20 is connected by welds 22 to pipeline 10. Trigger 16 is spring loaded so as to be urged into the pipeline by spring 24 and has an annular shoulder 26. This shoulder contacts a sphere 28 that is adapted to move freely in channel 30. A microswitch 32 is connected to upper housing 18 by means of an adjustable mount 34 and is provided with depressable activating end 31 extending through said mount. The adjustable mount may be fixed in position by potting its moveable parts in epoxy or lead after adjustment.

The new elements in the preferred embodiment of the invention include the ability to easily remove upper housing 18 from fixed base 20 and the provision of an adjustable mount 34 between upper housing 18 and microswitch 32. The microswitch's activating portion 31 that extends into channel 30 is in close juxtaposition to sphere 28.

Generally the invention operates as follows:

Displacer sphere 40 is adapted to fit within and move through pipeline 10. The sphere, or pig, in its passage through the pipeline, contacts outer end 21 of trigger 16. The pressure the pig places on end 21 of trigger 16 overcomes the force of spring 24 and forces trigger 16 upwards into opening 25. This action elevates annular shoulder 26 and forces sphere 28 to move through conduit 30 toward microswitch activating stud 31. This stud, when depressed by sphere 28, closes microswitch 32 signaling the presence of a pig. Except for the provision of an easily removable detecting apparatus and adjustable mount between top housing 18 and microswitch 32, the pig detector's structure and operation is fully described and explained in the disclosure incorporated by reference.

FIG. 2 of the drawings shows the preferred embodiment of the invention in the condition of having just been activated by a passing pig. Pig 40 is shown in contact with end 21 of trigger 16. At this time there is precise distance 42 between the top of the fixed base 20 and the bottom of trigger end 21. In the drawing the original position of end 21 is shown by dotted lines and the displaced position just sufficient to trigger the detector is shown by solid lines. As described above, movement of trigger 16 causes annular shoulder 26 to displace sphere 28. This displacement will be just sufficient to close microswitch 32. The trip point of microswitch 32 defines a distance 44 between front surface 33 of microswitch 32 and the forward end of extension 31. Distance 42 is the fixed dimension of the calibration jig (FIG. 5) used with the invention. Distance 44 is the distance to which movable coupling 34 is adjusted to calibrate the activating means linkage in the preferred embodiment of the invention.

FIG. 3 shows an isometric view of a calibration jig used to calibrate the preferred embodiment of the invention. A hardened gage plate 48 is provided with two upright supports 50 mounted orthogonally to the gage plate and set parallelly upon it spaced apart a sufficient distance to allow passage of trigger head 21. A top plate 52 is mounted on support plates 50 parallel to gage plate 48. Top plate 52 is provided with an opening 54 adapted to receive lower part 56 of upper housing 18 and to permit passage of end 21 of trigger 16 therethrough. Upper plate 52 is provided with attachment means 58, which may be threaded holes, to removably affix upper housing 18 on the calibration jig. The entire structure of the shop jig is made of any suitably hard material such as steel. The upper surface of upper plate 52 of the shop jig is separated from the upper surface of gage plate 48 by distance 42. This distance is the same as the distance between upper shoulder of fixed base 20 and end 21 of trigger 16, as shown in FIG. 2, when the trigger is in the condition of just activating the pig detector.

FIG. 4 shows upper housing 18 of pig detector 14 removed from fixed base 20. As is shown, upper housing 18 is connected to microswitch 32 by means of adjustable switch mount 34. The switch mount has a first thread 66 opposite an opposed second thread 68. One of these threads is left-handed and the other right-handed in order that rotation of a nut 70 screwed onto both threads will move microswitch 32 closer to or farther away from upper housing 18 depending on its direction of rotation. This mount provides a simple and effective method of changing the amount of play between sphere 28 and activating end 31 of microswitch 32. In the preferred embodiment of the invention, nut 70 may be potted in lead or plastic to fix the nut in position once the detector assembly has been calibrated. It will readily be observed that as nut 70 is rotated the slack between sphere 28 and microswitch activating end 31 is made greater or less. A corresponding greater or less movement by trigger 16 will be required to displace sphere 28 sufficiently to trigger microswitch 32.

Referring now to FIG. 5, there is shown the preferred embodiment of the invention mounted in a testing or calibration jig. Upper housing 18 mounts directly on non-adjustable calibration jig 47. End 21 of trigger 16 is in contact with gage plate 48. Trigger 16 is moved upward into space 25 by the jig. This correspondingly elevates annular shoulder 26 exactly the same amount as would a pig in a pipeline, as shown in FIG. 2, when the pig had just activated the detector. This elevation of annular shoulder 26 has moved sphere 28 into channel 30. Depending on the adjustment of adjustable switch mount 34, switchable end 31 of microswitch 32 will be more or less proximate sphere 28. At this time it is important to remember that trigger 16 of the detector and sphere 28 have been forced by jig 47 to assume exactly the same positions they would assume if a passing pig was just in position to trigger the pig detector.

Functionally, the preferred embodiment of the invention includes mounting the pig detector in a calibration jig to force the detector's apparatus into a condition simulating the presence of a pig at the point of the pig's detection by the detector and adjusting the slack between activating sphere 28 and microswitch activating means 31 of the detector by means of an adjustable switch mount 34 until microswitch 32 just closes. Detector assembly 18 is then replaced on fixed base 20 as shown in FIG. 2. Every pig detector calibrated in this manner will activate when the distance between the top of fixed base 20 and the bottom 21 of trigger 16 is equal to distance 42, which is defined by the calibration jig. Once a system utilizing pig detectors for precise volumetric measurement, such as is disclosed by the referenced valveless prover patent, is accurately calibrated, use of the preferred embodiment of the invention allows the system's associated pig detectors to be replaced or removed and remounted with assurance that they will trip when the pig is in exactly the same position as tripped the replaced detector. This eliminates the necessity of volumetrically recalibrating the meter prover or flow meter system after its associated pig detectors have been removed for repair or replacement.

Functionally, a system, such as the meter prover disclosed in the patent incorporated by reference, is set up and the preferred embodiment of the invention is mounted on it at the appropriate places to serve as pig detecting means. The entire system is then volumetrically calibrated. When it becomes necessary to replace or repair a pig detector, the detector is demounted from its fixed base. A replacement pig detector, of the same type or of any other type, is then mounted in a shop jig as shown in FIG. 4. This shop jig will force the moveable trigger of the detector to assume the same position it would assume if the detector had just been activated by a pig. At this time an adjustable threaded collar, such as is shown in FIG. 5 of the preferred embodiment of the invention, is adjusted until the microswitch closes. The adjustable collar connection between the microswitch and the detecting apparatus of the pig detector is then sealed by lock nuts or potting in epoxy or other means. The detecting apparatus is then remounted onto the fixed base as is shown in FIG. 1. Regardless of the initial characteristics of the pig detector, once it is calibrated as described above, the passing of a pig as shown in FIG. 2 sufficient to displace the trigger upward to the calibrated point defined by distance 42 in FIG. 2 will cause the detector to signal the presence of the pig.

The concept of the invention also allows reproducible control by fluidic and hydraulic means as well as by the electrical means described herein, and is adaptable to any meter prover having a trigger that comes in contact with a pig to detect the presence of the pig. Thus, the invention should not be limited to the specific embodiment disclosed and described herein, but only to such embodiments as may be included within the scope of the appended claims.

I claim:

1. Method for calibrating a pig detector having adjustable linkage means connected to activate reporting means in response to engagement of a trigger by a pig comprising the steps of:
    mounting the detector on a calibrated jig adapted to position the detector's trigger exactly as it would be positioned by a pig at the time of the pig's detection by the detector;
    adjusting the adjustable linkage means responsive to the trigger until the reporting means of the detector is marginally activated; and
    mounting the calibrated detector on a fixed base on an associated pipeline.

2. Method for maintaining a meter prover comprising the steps of:
    initially calibrating the meter prover by conventional volumetric means;
    removing a pig detector from its fixed base;
    determining the position of the removed pig detector's trigger that activates the pig detector;
    constructing a jig adapted to cause reproduction of this position by the trigger of a pig detecting apparatus when the apparatus is mounted in the jig;
    using the jig to calibrate a pig detecting apparatus; and
    mounting the calibrated pig detecting apparatus on its fixed base on the meter prover.

3. Apparatus for calibrating an adjustable pipeline pig detector having a trigger responsive to the passage of a pipeline pig, an adjustable linkage responsive to said trigger and a reporting means for reporting the presence of a pig responsive to said linkage comprising:
    a gauge plate;
    at least one upright securely attached at its lower end to said gauge plate;
    a detector receiving member securely attached to the upper end of said upright and capable of releaseably engaging said detector so said trigger engages said gauge plate and assumes the position it would assume upon detection of a pipeline pig.

* * * * *

UNITED STATES PATENT OFFICE
CERTIFICATE OF CORRECTION

Patent No. 4,079,619      Dated March 21, 1978

Inventor(s) Eugene Leslie Dobesh

It is certified that error appears in the above-identified patent and that said Letters Patent are hereby corrected as shown below:

Column 2, line 37, change "isometic" to -- isometric --.

Signed and Sealed this

Fifth Day of June 1979

[SEAL]

Attest:

RUTH C. MASON
*Attesting Officer*

DONALD W. BANNER
*Commissioner of Patents and Trademarks*